US011441968B2

(12) United States Patent
Smith (10) Patent No.: US 11,441,968 B2
(45) Date of Patent: Sep. 13, 2022

(54) SYSTEM AND METHOD FOR DETECTING LEAKS IN A SEALED COOLANT SYSTEM (71) Applicant: Rolls-Royce North American Technologies Inc., Indianapolis, IN (US)

(72) Inventor: Alan W. Smith, Greenwood, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 435 days.

(21) Appl. No.: 16/804,490

(22) Filed: Feb. 28, 2020

(65) Prior Publication Data
US 2021/0270690 A1 Sep. 2, 2021

(51) Int. Cl.
*G01M 3/04* (2006.01)
*F16L 23/16* (2006.01)
*G01L 19/00* (2006.01)

(52) U.S. Cl.
CPC ............ *G01M 3/04* (2013.01); *F16L 23/167* (2013.01); *G01L 19/0061* (2013.01); *G01L 2019/0053* (2013.01)

(58) Field of Classification Search
None
See application file for complete search history.

(56) References Cited

U.S. PATENT DOCUMENTS

| | | | |
|---|---|---|---|
| 2,675,493 A | 4/1954 | Lloyd | |
| 3,122,668 A | 2/1964 | Cuny | |
| 3,602,294 A | 8/1971 | Wanson | |
| 4,008,755 A | 2/1977 | Vandamme | |
| 4,167,858 A | 9/1979 | Kojima et al. | |
| 4,300,066 A | 11/1981 | Butler | |
| 4,440,017 A | 4/1984 | Barton et al. | |
| 4,614,087 A | 9/1986 | Nadamoto et al. | |
| 4,918,975 A * | 4/1990 | Voss | G01M 3/202 73/40.7 |
| 4,959,569 A | 9/1990 | Snuttjer et al. | |
| 5,022,265 A * | 6/1991 | Voss | G01M 3/205 73/40.7 |
| 6,826,948 B1 * | 12/2004 | Bhatti | G01M 3/188 73/49.1 |
| 7,069,883 B2 | 7/2006 | Atkins | |
| 7,886,580 B2 * | 2/2011 | Kumar | G01M 3/3227 73/40.7 |
| 8,751,101 B2 | 6/2014 | Weber et al. | |
| 8,844,551 B2 | 9/2014 | Doughty et al. | |
| 9,151,695 B2 | 10/2015 | Worden et al. | |
| 9,488,629 B2 | 11/2016 | Xu et al. | |

(Continued)

*Primary Examiner* — Peter J Macchiarolo
*Assistant Examiner* — Jermaine L Jenkins
(74) *Attorney, Agent, or Firm* — Barnes & Thornburg LLP (57) ABSTRACT

A sealed cooling system includes a coolant tank having a liquid space configured to hold liquid coolant, and a gas space configured to hold gas. A temperature sensor detects the temperature of the liquid coolant. A pressure sensor detects the pressure in the coolant tank. A processor compares the pressure in the coolant tank to predicted pressure in the coolant tank as a function of liquid coolant temperature. The processor determines and outputs a signal indicative of a leak in the sealed cooling system if the pressure in the coolant tank deviates from the predicted pressure in the coolant tank according to predetermined criteria.

20 Claims, 4 Drawing Sheets

(56) References Cited

U.S. PATENT DOCUMENTS

| | | |
|---|---|---|
| 9,869,499 B2 | 1/2018 | Liu et al. |
| 10,472,996 B2 | 11/2019 | Singh et al. |
| 2007/0193285 A1 | 8/2007 | Knight et al. |

* cited by examiner

SYSTEM AND METHOD FOR DETECTING LEAKS IN A SEALED COOLANT SYSTEM

FIELD OF THE DISCLOSURE

The present disclosure relates generally to a sealed cooling system for use in aerospace applications and more specifically to leak detection in a sealed coolant system.

BACKGROUND

Sealed cooling systems are used in aerospace applications to remove heat from heat sources, for example, motors, generators, and other components that generate heat when operated. Such cooling systems typically include the heat source; a working fluid or coolant configured to receive heat from the heat source, thereby heating the coolant; a heat exchanger configured to receive heat from the heated coolant and to reject the heat to an environment, thereby cooling the coolant; a coolant pump configured to move the coolant; and a fluid conduit fluidly coupling the heat source, the heat exchanger, and the coolant pump, thereby enabling the coolant pump to move the coolant from the coolant pump to the heat source, from the heat source to the heat exchanger, and from the heat exchanger back to the pump. Such cooling systems also typically include a coolant tank or reservoir including a liquid space for holding liquid coolant and a gas space for holding coolant vapor and other gasses, and configured to accommodate thermal expansion of the liquid coolant.

Although such cooling systems often are sealed by design, sealed cooling systems sometimes develop leaks through which liquid coolant or vapor can escape from the sealed cooling system. Even minor coolant leaks could cause environmental concerns. Larger coolant leaks could compromise the sealed cooling system's ability to adequately cool the heat source. Failure to adequately cool the heat source could result in damage to the heat source or the need to curtail operation of the heat source in order to avoid damage thereto. As such, it would be desirable to provide a system and method configured to detect leakage in the sealed cooling system.

SUMMARY

The present disclosure may comprise one or more of the following features and combinations thereof.

According to an aspect of the present disclosure, a sealed cooling system for use in an aerospace application includes a coolant tank, a heat source, a heat exchanger, a pressure sensor, a temperature sensor, and a processor. The coolant tank is configured to hold a liquid coolant and a gas comprising at least one of air and liquid coolant vapor. The coolant tank includes a liquid coolant space configured to hold the liquid coolant; a gas space configured to hold the gas; and a heat source configured to transfer heat from the heat source to the liquid coolant. The heat exchanger is configured to reject heat from the liquid coolant to an environment. The pressure sensor is configured to detect a pressure in the coolant tank and to output signals indicative of the pressure in the coolant tank as a function of time.

The temperature sensor is configured to detect a temperature within the sealed cooling system and to output signals indicative of the temperature within the sealed cooling system as a function of time. In some embodiments, the processor is configured to receive the signals indicative of the pressure and the signals indicative of the temperature and to provide an output indicative of a leak in the sealed cooling system based on detected changes in the pressure in the coolant tank as a function of detected changes in the temperature within the sealed cooling system compared to anticipated changes in the pressure in the coolant tank as a function of detected changes in temperature within the sealed cooling system.

In some embodiments, the processor may be configured to provide the output indicative of a leak in the sealed cooling system when the detected pressure in the gas space is lower than an anticipated pressure in the coolant tank.

In some embodiments, the processor may be configured to provide the output indicative of a leak in the sealed cooling system when the pressure in the coolant tank increases at a rate lower than an anticipated rate as a function of an increase in the temperature within the liquid cooling system.

In some embodiments, the processor may be configured to provide the output indicative of a leak in the sealed cooling system when the pressure in the coolant tank decreases at a rate lower than an anticipated rate as a function of a decrease in the temperature within the liquid cooling system.

In some embodiments, the processor may be configured to provide the output indicative of a leak in the sealed cooling system when: the pressure in the coolant tank increases from an initial pressure to an elevated pressure as a function of an increase in the temperature within the sealed cooling system from an initial temperature to an elevated temperature, and the pressure in the coolant tank then decreases to a pressure less than the initial pressure as a function of a decrease in the temperature within the sealed cooling system from the elevated temperature to the initial temperature.

In some embodiments, the processor may be configured to provide the output indicative of a leak in the sealed cooling system when: the pressure in the coolant tank increases from an initial pressure to an elevated pressure as a function of an increase in the temperature within the sealed cooling system from an initial temperature to an elevated temperature, the pressure in the coolant tank then decreases to a pressure less than the initial pressure as a function of a decrease in the temperature within the sealed cooling system from the elevated temperature to the initial temperature, and the pressure in the coolant tank then increases to the initial pressure with the temperature within the sealed cooling system at or less than the initial temperature.

In some embodiments, the system may include an ambient pressure sensor configured to detect ambient pressure outside the sealed cooling system. The system may be configured to output signals indicative of the ambient pressure outside the sealed cooling system as a function of time. The processor may be configured to receive the signals indicative of the ambient pressure outside the sealed cooling system and to provide the output indicative of the leak in the sealed cooling system when the pressure in the coolant tank increases or decreases as a function of corresponding increases or decreases in the temperature within the sealed cooling system and as a function of corresponding decreases or increases in the ambient pressure at a rate less than or greater than an anticipated rate.

In some embodiments, the system may include an ambient pressure sensor configured to detect ambient pressure outside the sealed cooling system and to output signals indicative of the ambient pressure outside the sealed cooling system as a function of time. The processor may be configured to receive the signals indicative of the ambient pressure outside the sealed cooling system and to provide the output indicative of the leak in the sealed cooling system when the pressure in the coolant tank increases or decreases as a function of corresponding decreases or increases in the ambient pressure at a rate less than or greater than an anticipated rate.

In some embodiments, the system may include a coolant pump configured to pump the liquid coolant and a coolant pump output pressure sensor configured to detect an output pressure of the coolant pump and to output signals indicative of the output pressure of the coolant pump. The processor may be configured to receive the signals indicative of the output pressure of the coolant pump and to provide the signal indicative of the leak in the sealed cooling system when the signals indicative of the output pressure of the coolant pump indicate that the output pressure of the coolant pump is decreasing consistent with pressure in the coolant tank or is less than a predetermined value when the coolant pump is running.

According to another aspect of the disclosure, a method of detecting leakage in a sealed cooling system for use in an aerospace application may include a number of steps. The method may include providing a coolant tank configured to hold a liquid coolant and a gas comprising at least one of air and liquid coolant vapor, the coolant tank comprising: a liquid coolant space configured to hold the liquid coolant; a gas space configured to hold the gas; and providing a heat source configured to transfer heat from the heat source to the liquid coolant. The method may include providing a heat exchanger configured to reject heat from the liquid coolant to an environment; providing a pressure sensor configured to detect a pressure in the coolant tank and to output signals indicative of the pressure in the coolant tank as a function of time; providing a temperature sensor configured to detect a temperature within the sealed cooling system and to output signals indicative of the temperature within the sealed cooling system as a function of time; providing a processor configured to receive the signals indicative of the pressure and the signals indicative of the temperature; and determining the presence of a leak in the sealed cooling system based on detected changes in the pressure in the coolant tank as a function of detected changes in the temperature within the sealed cooling system compared to anticipated changes in the pressure in the coolant tank as a function of detected changes in temperature within the sealed cooling system.

In some embodiments, the method may include the step of determining the presence of a leak in the sealed cooling system when the detected pressure in the coolant tank is lower than an anticipated pressure in the coolant tank.

In some embodiments, the method may include the step of determining the presence of a leak in the sealed cooling system when the pressure in the coolant tank increases at a rate lower than an anticipated rate as a function of an increase in the temperature within the sealed cooling system.

In some embodiments, the method may include the step of determining the presence of a leak in the sealed cooling system when the pressure in the coolant tank decreases at a rate lower than an anticipated rate as a function of a decrease in the temperature within the sealed cooling system.

In some embodiments, the method may include the step of determining the presence of a leak in the sealed cooling system when: the pressure in the coolant tank increases from an initial pressure to an elevated pressure as a function of an increase in the temperature within the sealed cooling system from an initial temperature to an elevated temperature, and the pressure in the coolant tank then decreases to a pressure less than the initial pressure as a function of a decrease in the temperature within the sealed cooling system from the elevated temperature to the initial temperature.

In some embodiments, the method may include the step of determining the presence of a leak in the sealed cooling system when: the pressure in the coolant tank increases from an initial pressure to an elevated pressure as a function of an increase in the temperature within the sealed cooling system from an initial temperature to an elevated temperature, the pressure in the coolant tank then decreases to a pressure less than the initial pressure as a function of a decrease in the temperature within the sealed cooling system from the elevated temperature to the initial temperature, and the pressure in the coolant tank then increases to the initial pressure with the temperature within the sealed cooling system at or less than the initial temperature.

In some embodiments, the method may include the steps of: providing an ambient pressure sensor configured to detect ambient pressure outside the sealed cooling system and to output signals indicative of the ambient pressure outside the sealed cooling system as a function of time, and determining the presence of a leak in the sealed cooling system when the pressure in the coolant tank increases or decreases as a function of corresponding increases or decreases in the temperature within the sealed cooling system and as a function of corresponding decreases or increases in the ambient pressure at a rate greater than an anticipated rate.

In some embodiments, the method may include the steps of: providing a coolant pump configured to pump the liquid coolant and a coolant pump output pressure sensor configured to detect coolant pump output pressure and to output signals indicative of the coolant pump output pressure as a function of time, and determining the presence of a leak in the sealed cooling system when the coolant pump output pressure is decreasing consistent with decreasing pressure in the coolant tank or is less than a predetermined value when the coolant pump is running.

According to another aspect of the disclosure, a method of detecting leakage in a sealed cooling system for use in an aerospace application includes a number of steps. The sealed cooling system including a coolant tank having a liquid space configured to hold a liquid coolant, and having a gas space configured to hold gas. The method including detecting a first temperature within the sealed cooling system; detecting a first pressure in the coolant tank corresponding to the first temperature; detecting a second temperature within the sealed cooling system greater than the first temperature; predicting a second pressure in the gas space corresponding to the second temperature; detecting a second pressure in the coolant tank corresponding to the second temperature; comparing the detected second pressure to the predicted second pressure; and determining the presence of a leak in the sealed cooling system if the detected second pressure deviates from the predicted second pressure according to predetermined criteria.

In some embodiments, the method may include the steps of: detecting a third temperature within the sealed cooling system greater than the second temperature; predicting a third pressure in the gas space corresponding to the second temperature; detecting a third pressure in the gas space corresponding to the second temperature; comparing the detected third pressure to the predicted third pressure; and determining the presence of a leak in the sealed cooling system if a rate of change of pressure in the gas space based on the first, second, and third pressures deviates from a predicted rate of change of pressure in the coolant tank according to predetermined criteria.

In some embodiments, the method may include the steps of: detecting first, second, and third ambient pressures of an environment outside the sealed cooling system corresponding to the first, second, and third temperatures; comparing the first, second, and third ambient pressures to the first, second third pressure; and determining the presence of a leak in the sealed cooling system if the first, second, and third detected pressures in the coolant tank track the first, second, and third ambient pressures according to predetermined criteria.

These and other features of the present disclosure will become more apparent from the following description of the illustrative embodiments.

BRIEF DESCRIPTION OF THE DRAWINGS

FIG. 1 is a schematic view of an illustrative sealed cooling system according to the present disclosure, the system including a coolant tank configured to hold liquid coolant and air, and having a liquid coolant space, a gas space, a liquid coolant fill port, a liquid coolant spill port, a liquid coolant outlet port, and a liquid coolant inlet port; a liquid coolant pump; a heat source; a heat sink; a sealed cooling system pressure sensor; a sealed cooling system temperature sensor; a coolant pump output pressure sensor; an ambient pressure sensor; and a processor configured to receive signals from the sealed cooling system pressure sensor, the sealed cooling system temperature sensor, the coolant pump output pressure sensor, and the ambient pressure sensor, and to determine and output a signal indicative of a leak in the sealed cooling system;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

System Configuration

The drawings show an illustrative embodiment of a sealed cooling system 10 having an integrated leak detection feature. The system 10 includes a coolant tank (or reservoir or accumulator) 12; a coolant pump 14; a heat source 16; a heat sink 18; and coolant lines 20 connecting the coolant tank 12, the coolant pump 14, the heat source 16, and heat sink 18 in fluid communication with each other. The sealed cooling system 10 also includes a system pressure sensor 22, a system temperature sensor 24, an optional coolant pump output pressure sensor 25, an optional ambient pressure sensor 26, and a processor 28.

The coolant tank 12 defines a liquid space 30 configured to hold liquid coolant and a gas space 32 configured to hold gas. The liquid coolant may be water, a water-glycol mix, oil, or another liquid coolant. The gas may include one or more of air, coolant vapor, other vapor, and other non-condensables.

The coolant tank 12 may include a fill port 34 at an upper portion thereof and a spill port 36 at an intermediate portion thereof. The placement of the spill port 36 with respect to the vertical height of the coolant tank 12 may determine the level of an interface I between the liquid coolant space 30 and the gas space 32, as will be discussed further below. Removable caps 38 seal the fill port 34 and the spill port 36 when the fill port 34 and the spill port 36 are not in use. In some embodiments, the removable caps 38 may be supplemented or replaced with valves (not shown) or other isolation devices configured to selectively open and seal the fill port 34 and the spill port 36. In some embodiments, a supplemental fluid conduit (not shown) may fluidly couple the fill port 34 to a remote source of liquid coolant. Also, a supplemental fluid conduit (not shown) may fluidly couple the spill port 36 to a remote receptacle of liquid coolant.

The coolant pump 14 may be embodied as any form of pump configured to pump liquid coolant. The coolant pump 14 is configured to pump the liquid coolant through the coolant tank 12, the heat source 16, the heat sink 18, and the coolant lines 20 as shown by the arrows in the drawings.

The heat source 16 may be embodied as any form of equipment from which it is desired to remove heat. For example, without limitation, the heat source 16 may be embodied as a mechanical gearbox, an electrical motor, or an electrical generator.

The heat sink 18 may be embodied as any form of heat exchanger. For example, without limitation, the heat sink 18 may be a liquid-to-liquid or liquid-to-air heat exchanger.

As shown, the system pressure sensor 22 is associated with the coolant tank 12 in fluid communication with the gas space 32 and is configured to detect pressure within the coolant tank 12. The system pressure sensor 22 also is configured to provide an output signal indicative of the pressure within the coolant tank 12 to the processor 28. In some embodiments, the system pressure sensor 22 may be located elsewhere in the sealed cooling system and configured to detect and provide an output signal indicative of pressure within the sealed cooling system 10.

The system temperature sensor 24 is configured to detect the temperature with the system 10. As shown, the system temperature sensor 24 is associated with the coolant tank 12 and is configured to detect the temperature of liquid coolant in the coolant tank 12. Alternatively, the system temperature sensor 24 may be associated with another portion of the liquid coolant loop including the coolant tank 12, the liquid coolant pump 14, the heat source 16, the heat sink 18, and the coolant lines 20, and configured to detect the temperature of the liquid coolant there. In some embodiments, the system temperature sensor 24 may be associated the gas space 32 and configured to detect the temperature of gas in the gas space 32. The system temperature sensor 24 also is configured to provide an output signal indicative of the temperature within the system 10 to the processor 28.

The optional coolant pump output pressure sensor 25 is associated with the outlet or pressure side of the coolant pump 14 and is configured to detect an output pressure of the coolant pump 14. The optional coolant pump output pressure sensor 25 also is configured to provide an output signal indicative of the output pressure of the coolant pump 14 to the processor 28.

The optional ambient pressure sensor 26 is configured to detect ambient pressure of an environment E outside the sealed cooling system 10. The optional ambient sensor 26 also is configured to provide an output signal indicative of the ambient pressure to the processor 28.

The processor 28 is configured to receive the output signals from the system pressure sensor 22, the system temperature sensor 24, the optional coolant pump output pressure sensor 25 (if provided), and the optional ambient pressure sensor 26 (if provided). The processor 28 also is configured to compare the actual pressure in the gas space 32 as detected by the system pressure sensor 22 to predicted variations in pressure in the gas space 32 as a function of variations in temperature within the system 10 as detected by the system temperature sensor 24 at predetermined intervals. The processor 28 further is configured to provide an output signal indicative of a leak of liquid coolant or a leak of gas from the sealed cooling system 10, based on the foregoing comparison and further based on predetermined criteria accessible to or stored in the processor 28, as will be discussed further below.

In use, the sealed cooling system 10 is filled with a predetermined quantity of liquid coolant in any suitable manner so that the gas space 32 is occupied by gas and the rest of the sealed cooling system 10 is occupied by liquid coolant. For example, the sealed cooling system 10 may be filled with liquid coolant at ambient pressure by removing the caps 38 from the fill port 34 and the spill port 36, and by adding liquid coolant to the coolant tank 12 via the fill port 34 until the liquid coolant overflows from the spill port 36. The caps 38 may then be installed to the fill port 34 and the spill port 36 to seal the sealed cooling system 10. Typically, the coolant tank 12 would be level during the foregoing procedure. Filling the sealed cooling system 10 with the liquid coolant in the foregoing manner sets the interface between the liquid space 30 and the gas space 32 at a predetermined level, namely, the level of the bottom of the spill port 36. In some embodiments, the sealed cooling system 10 may be filled with liquid coolant at greater-than-ambient pressure in any suitable manner.

Theory of Operation

With the sealed cooling system 10 initially filled with liquid coolant as discussed above, and prior to operation of the sealed cooling system 10, an initial volume of the gas space 32 is known based on the level of liquid coolant in the coolant tank 12 and the geometry of the coolant tank 12. Also, the temperature within the system 10 has an initial temperature value, and the pressure in the gas space 32 has an initial pressure value. The initial temperature value is determined by the system temperature sensor 24, which outputs a signal indicative of the initial temperature value to the processor 28. Similarly, the initial pressure value is determined by the system pressure sensor 22, which outputs a signal indicative of the initial gas space pressure value to the processor 28.

When the sealed cooling system 10 and the heat source 16 are placed into operation, heat QIN is added to the liquid coolant by transfer of heat to the liquid coolant from the heat source 16. Heat $Q_{OUT}$ is rejected from the liquid coolant to the environment E by the heat sink 18. Notwithstanding the rejection of heat $Q_{OUT}$ from the liquid coolant by the heat sink 18, the temperature of the liquid coolant increases from an initial temperature to an operating temperature greater than the initial temperature, which operating temperature may vary over a range. It is assumed that the temperature of the gas in the gas space 32 will increase to the same value or about the same value as the temperature of the liquid coolant based on interaction of the gas in the gas space 32 with the liquid coolant in the liquid space 30. Because the sealed cooling system 10 is sealed, the pressure in the gas space 32 may be expected to increase as a function of the increase in temperature of the gas in the gas space 32 according to applicable gas laws that would be known to one skilled in the art.

Similarly, when the sealed cooling system 10 and the heat source 16 are shut down, the temperature of the liquid coolant eventually will decrease from the operating temperature to the initial temperature or another temperature lower than the operating temperature. It is assumed that the temperature of the gas in the gas space 32 will decrease to the same level or about the same level as the temperature of the liquid coolant based on interaction of the gas in the gas space 32 with the liquid coolant in the liquid space 30. Because the sealed cooling system 10 is sealed, it may be expected that the pressure in the gas space 32 will decrease as a function of the decrease in temperature of the gas in the gas space 32 according to the applicable gas laws.

The foregoing expected changes in pressure in the gas space 32 based upon changes in the temperature of the liquid coolant can be predicted using the applicable gas laws. More specifically, the pressure in the gas space 32 can be predicted for any coolant temperature based on the initial pressure in the gas space and the initial coolant temperature.

In some embodiments, changes in pressure in the gas space 32 further can be predicted based upon one or more additional factors including, without limitation: the thermal expansion coefficient of the liquid coolant; the bulk modulus of the liquid coolant; changes in volume of the sealed coolant system based on thermal expansion and contraction of the pressure boundary of the coolant tank 12, the liquid coolant pump 14, the heat source 16, and the heat sink 18 and the liquid coolant piping 20 of the sealed cooling system 10 in response to changes in temperature of such components; and elastic deflection of the pressure boundary of the sealed cooling system 10 in response to changes in the pressure internal and external thereto. In other embodiments, these additional factors may be ignored as insignificant.

Operation—General

The processor 28 is configured to determine the existence of a leak in the sealed cooling system 10, and to output a signal indicative of such a leak, by comparing actual pressure in the gas space 32 (as detected by the system pressure sensor 22) to the predicted pressure in the gas space 32 as a function of the temperature within the system 10 as detected by the system temperature sensor 24.

With no leak in the sealed cooling system 10, the actual pressure in the gas space 32 is expected to closely correspond to the predicted pressure in the gas space 32 as a function of the liquid coolant temperature within a predetermined margin or tolerance. The processor 28 is configured to not provide an output indicative of a leak in the sealed cooling system 10 if the actual pressure in the gas space 32 corresponds to the predicted pressure in the gas space 32 within the predetermined margin or tolerance as a function of the liquid coolant temperature.

With a leak in the sealed cooling system 10, the actual pressure in the gas space 32 may be expected to vary substantially from the predicted pressure in the gas space 32 as a function of the liquid coolant temperature in various ways, thereby providing an indication of the presence, location, and extent of the leak in the sealed cooling system, as will be discussed further below.

Gas Leaks

Figure 1:
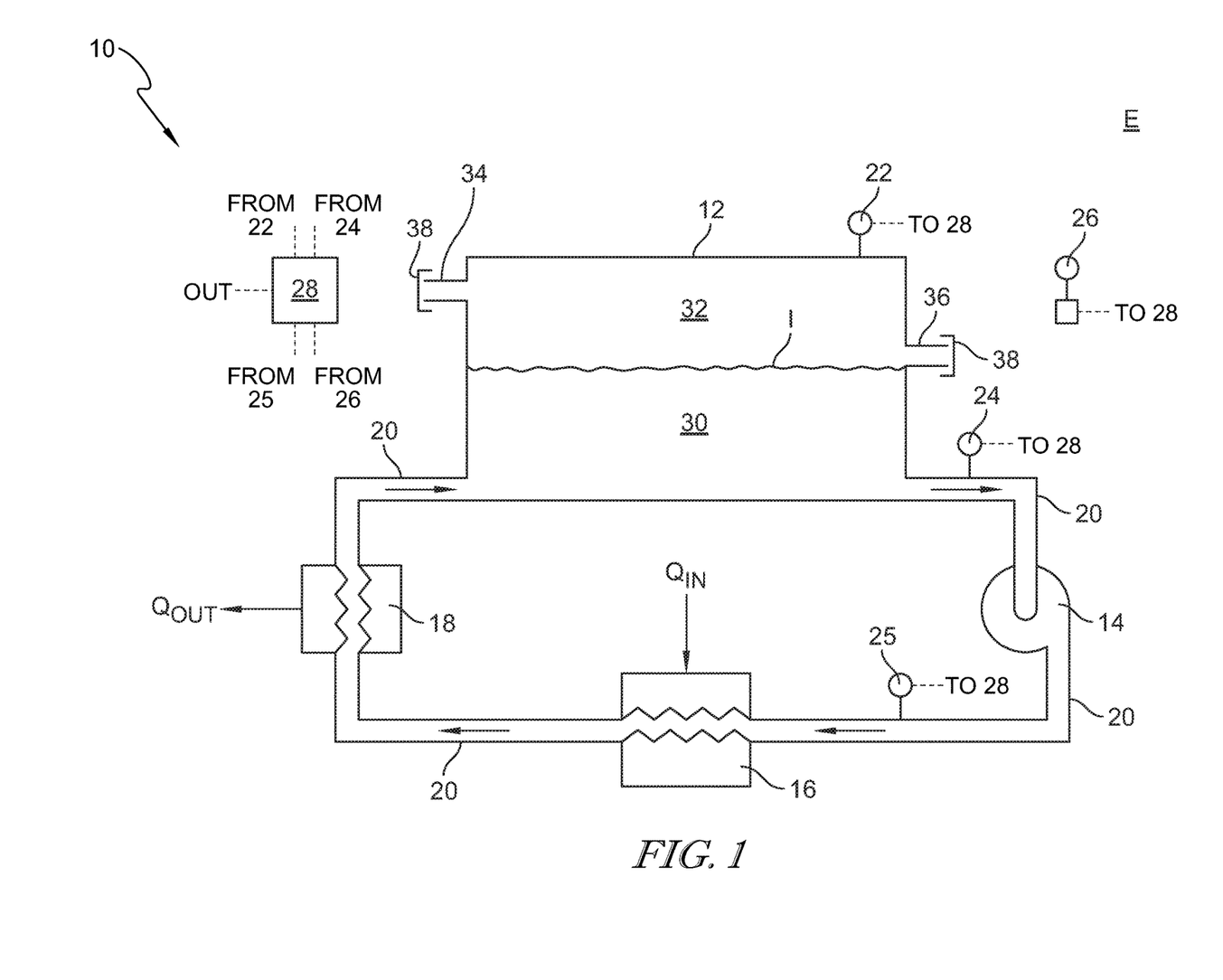
Figure 2:
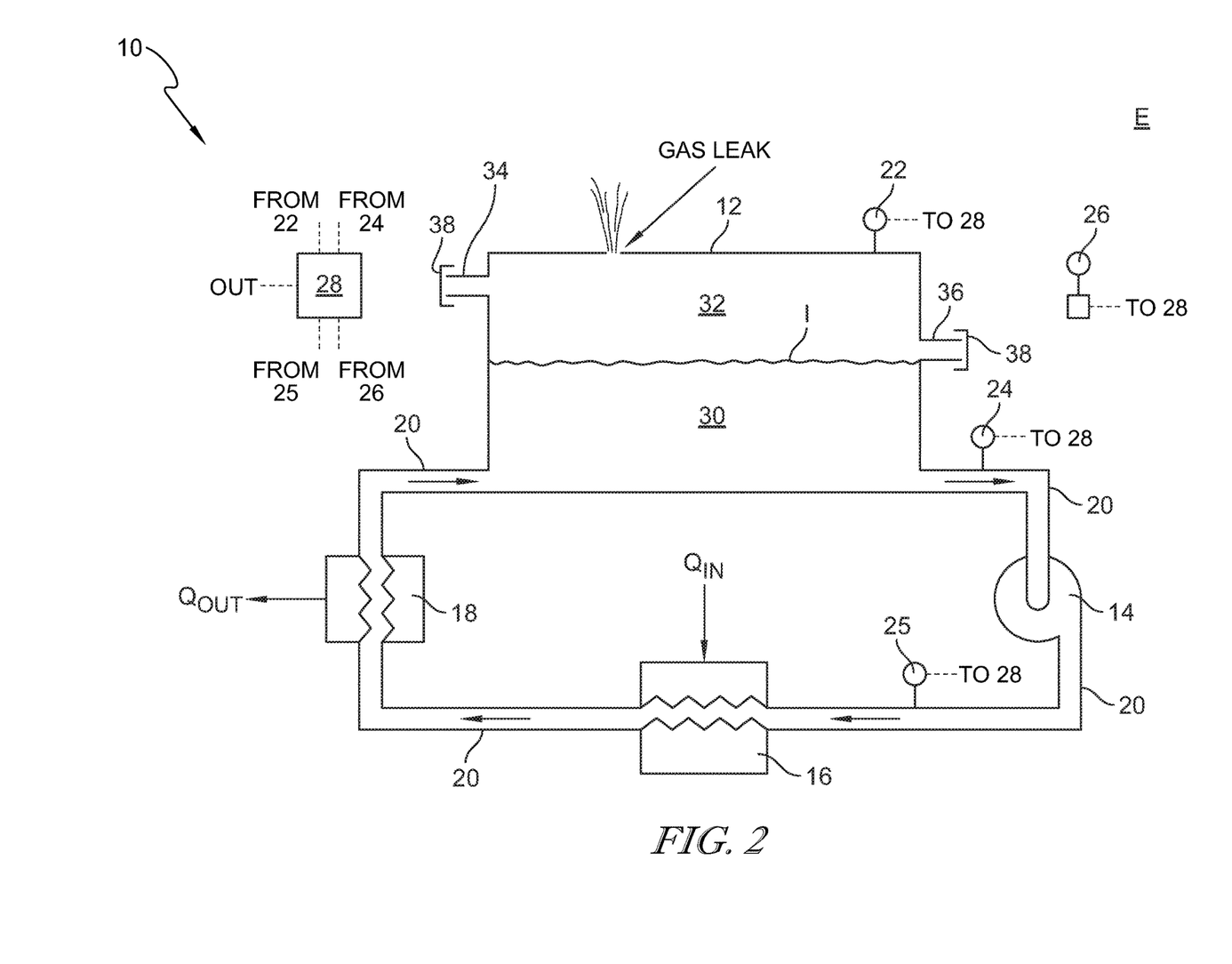
FIG. 2 is a schematic view of the sealed cooling system of FIG. 1 further illustrating a leak in a gas-containing portion of the sealed cooling system.

With reference to FIG. 2, in the event a gas leak develops between the gas space 32 and the environment E, gas will migrate through the leak from a region of higher pressure to a region of lower pressure. In embodiments wherein the initial pressure in the gas space 32 is at or greater than ambient pressure (the pressure of the environment E), gas will migrate through the leak from the gas space 32 to the environment E as pressure in the gas space 32 remains at or increases above ambient pressure. Similarly, gas will migrate through the leak from the environment E into the gas space 32 as pressure in the gas space 32 falls below ambient pressure.

Small Leaks in the Gas Space

With a small leak in the gas space 32, and with the initial pressure in the gas space 32 at ambient pressure, gas will slowly leak from the gas space 32 to the environment E as the liquid coolant temperature increases and thereby increases the pressure in the gas space 32.

Under these circumstances, the actual pressure in the gas space 32 may be expected to lag the predicted pressure in the gas space 32 (that is, to increase to a lesser value than predicted) as a function of increasing liquid coolant temperature. Similarly, the actual rate of increase of pressure in the gas space 32 may be expected to lag a predicted rate of increase of pressure in the gas space 32 (that is, to increase less rapidly than predicted) as a function of increasing liquid coolant temperature.

Also, the actual pressure in the gas space 32 may be expected to lead the predicted pressure in the gas space 32 (that is, to decrease to a lesser value than predicted) as a function of decreasing liquid coolant temperature. Indeed, the actual pressure in the gas space 32 may fall below the initial pressure in the gas space 32 as the liquid coolant temperature falls from the operating temperature to the initial coolant temperature. The actual pressure in the gas space 32 may then increase to ambient pressure. Further, the actual rate of decrease of pressure in the gas space 32 may lag a predicted rate of decrease in pressure in the gas space as a function of decreasing coolant temperature.

In embodiments wherein the sealed cooling system 10 is used in an aircraft or other aerospace application wherein the sealed cooling system 10 is subject to variations in ambient pressure due to changes in altitude during operation thereof, the gas leakage rate for a given leak may vary based on such variations in ambient pressure.

The foregoing phenomena result from the loss of gas from the gas space 32 to the environment E through the small leak in response to increasing pressure in the gas space 32, followed by reentry of gas from the environment E to the gas space 32 in response to decreasing pressure in the gas space 32. More specifically, the predicted pressure in the gas space 32 as a function of coolant temperature assumes a constant mass of gas in the gas space 32. As gas is lost from the gas space 32 through the leak, the mass of gas in the gas space 32 decreases from an initial mass of gas in the gas space 32. Accordingly, a given increase in liquid coolant temperature and gas temperature yields less increase in pressure in the gas space 32 than predicted.

Similarly, with less than the initial mass of gas in the gas space 32, the pressure in the gas space 32 will decrease to a lower value than predicted as a function of decreasing liquid coolant temperature and gas temperature. Indeed, the pressure in the gas space 32 may be expected to initially decrease below the initial pressure and the ambient pressure when the liquid coolant temperature decreases to the initial liquid coolant temperature. Under these circumstances, gas may be expected to migrate through the small leak from the environment E into the gas space 32, so that the pressure in the gas space 32 eventually returns to ambient pressure.

The processor 28 is configured to output a signal indicative of a small gas leak when the actual pressure in the gas space 32 deviates by more than the predetermined margin from the predicted pressure in the gas space as a function of increasing and decreasing liquid coolant temperature as discussed above.

In some embodiments, the sealed cooling system 10 may be initially pressurized so that the initial pressure in the gas space 32 is greater than ambient pressure. In such embodiments, the pressure in the gas space 32 would change as a function of changing liquid coolant temperature in response to a small gas leak as discussed above, and the processor 28 would determine and output a signal indicative of such a small gas leak as discussed above. The processor 28 may further determine the presence of a small gas leak if the pressure in the gas space 32 decreases to a value less than the initial value and returns to ambient pressure but not to the initial pressure (which was above ambient pressure) when the liquid coolant temperature decreases from the operating temperature to the initial temperature.

In embodiments including the optional ambient pressure sensor 26, the processor 28 may further use the output of the optional ambient pressure sensor 26 to determine and provide an output indicative of whether the pressure in the gas space 32 is tracking ambient pressure and, if so, to what extent. The processor 28 may use this information to determine and provide an output indicative of the relative magnitude of the leak. For example, with a leak in the gas space 32 as discussed above, the pressure in the gas space 32 could fall below the initial pressure in the gas space 32 during operation of the sealed cooling system 10 if the sealed cooling system 10 is moved to a region of lower ambient pressure. This scenario might occur where the sealed cooling system 10 is used in an aerospace vehicle that moves between relatively low and high altitudes and, therefore, between relatively high and low ambient pressures, respectively. The processor 28 could be configured to determine and output a signal indicative of a leak in the gas space 32 under these conditions. Also, the processor could further determine and output a signal indicative of the extent of such a gas leak based on the rate of change of pressure in the gas space 32 as a function of the rate of change of ambient pressure.

Large Leaks in the Gas Space

With a large leak in the gas space 32 or other portion of the cooling system 10 in gas communication with the gas space 32, the actual pressure in the gas space 32 may be expected to not rise substantially, to not rise at all from the initial pressure in the gas space 32, or to closely and rapidly track ambient pressure. One example of such a large gas leak is a situation in which either or both of the fill port 34 and the spill port 36 have not been sealed with the caps 38 or otherwise. Another example of such a large gas leak is a rupture of the coolant tank 12 or other pressure boundary component in gas communication with the gas space.

The processor 28 may be configured to determine and provide an output indicative of the presence of such a large leak if the actual pressure in the gas space 32 does not rise substantially or does not rise at all from the initial pressure in the gas space 32. In embodiments including the optional ambient pressure sensor 26, the processor 28 may further be configured to determine and provide an output indicative of the presence of such a large leak if the pressure in the gas space 32 closely and rapidly tracks ambient pressure.

Liquid Leaks

Figure 3:
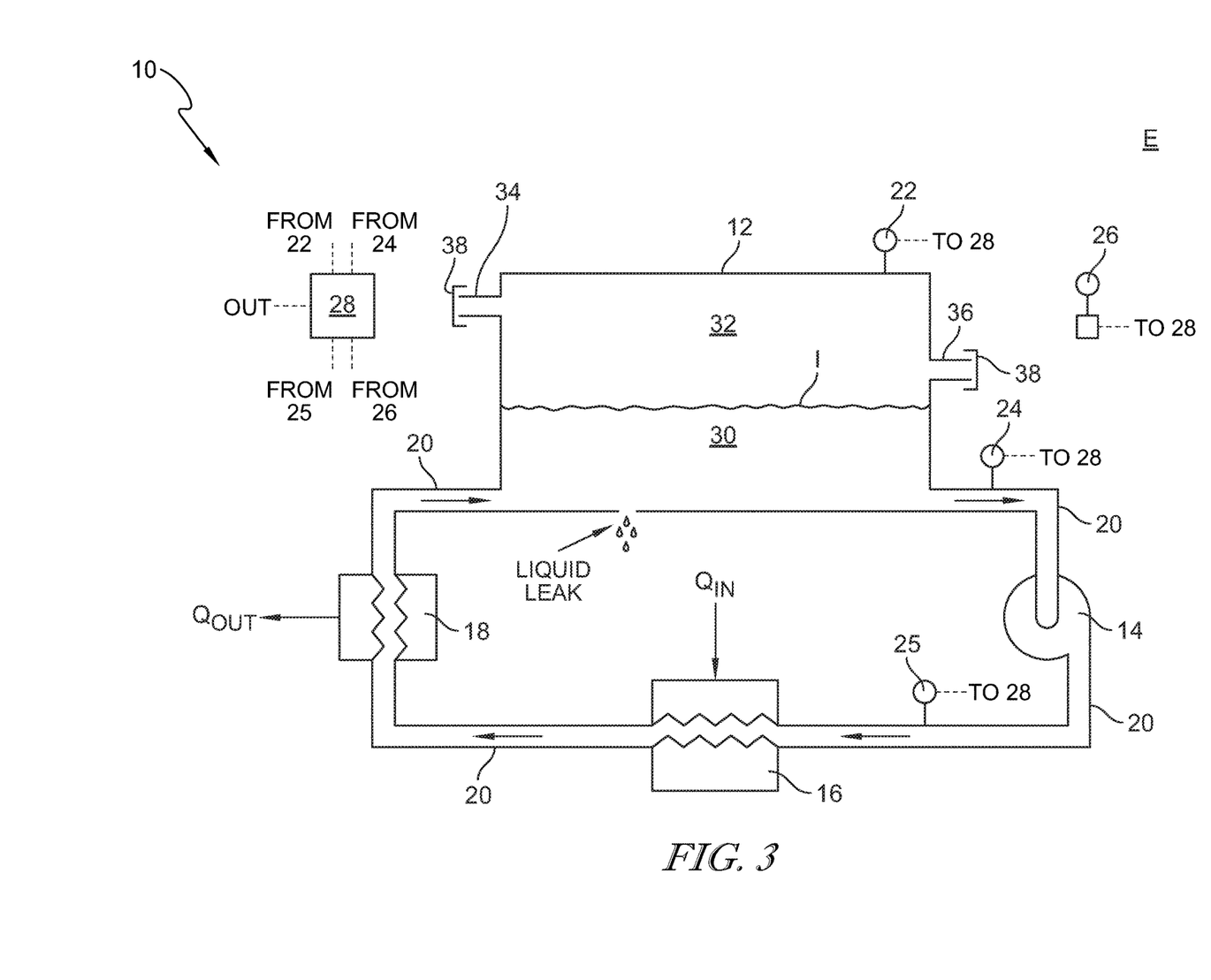
FIG. 3 is a schematic view of the sealed cooling system of FIG. 1 further illustrating a leak in a low-pressure, liquid-containing portion of the sealed cooling system.
Figure 4:
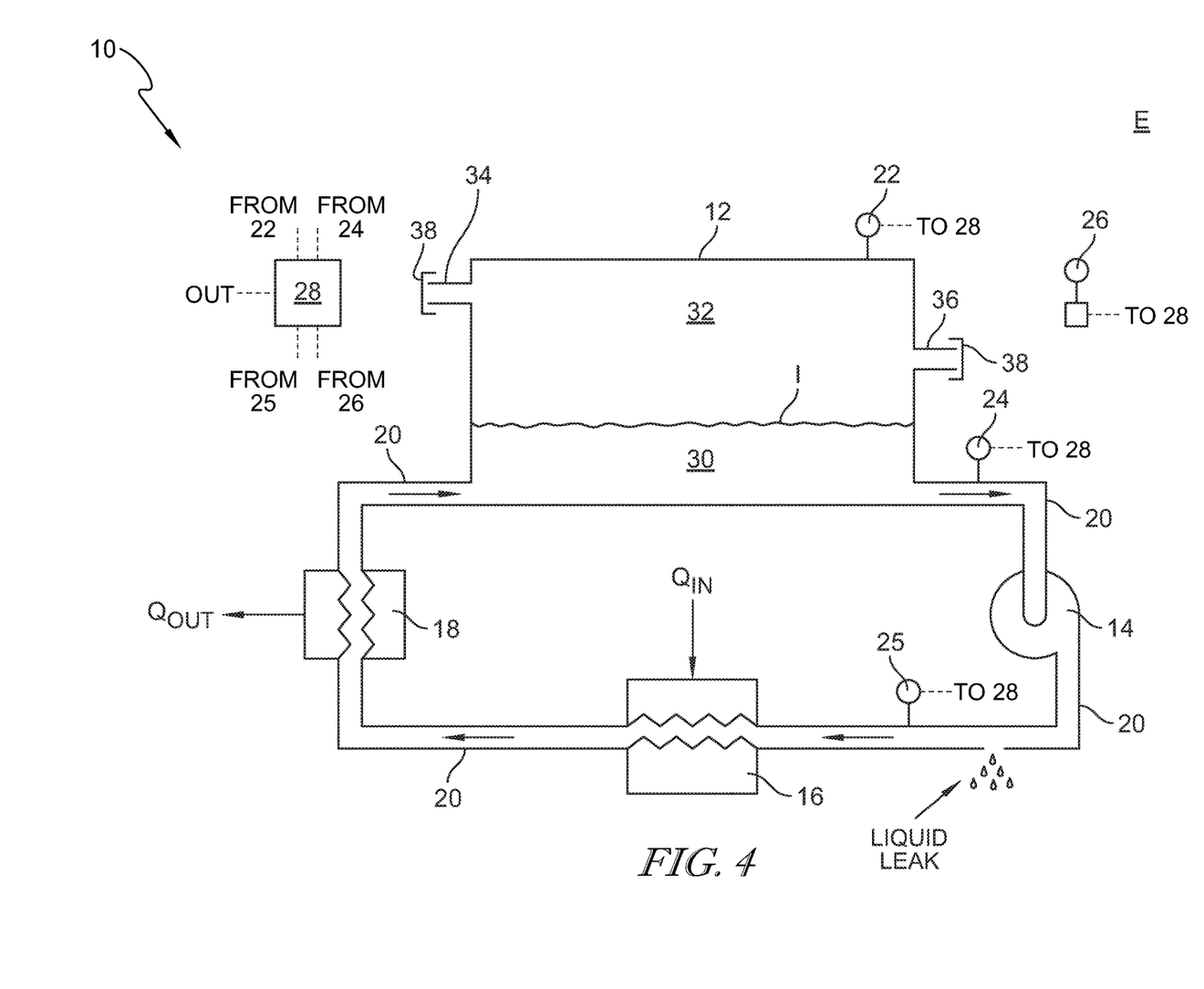
FIG. 4 is a schematic view of the sealed cooling system of FIG. 1 further illustrating a leak in a high-pressure, liquid-containing portion of the sealed cooling system.

With reference to FIGS. 3 and 4, in the event a leak develops between the liquid space 30 and the environment E, liquid coolant will migrate through the leak from a region of higher pressure to a region of lower pressure. In embodiments wherein the initial pressure in the liquid space 30 proximate the leak is at or above ambient pressure, liquid coolant will migrate through the leak from the liquid space 30 to the environment E as pressure in the liquid space remains at or increases above ambient pressure. Similarly, fluid will migrate from the environment E as the pressure in the liquid space 30 proximate the leak falls below ambient pressure. It is expected that liquid coolant leaking out of the sealed cooling system 10 will drip or spray away from the leak. As such, it is expected that such fluid migrating through the leak from the environment E as the pressure in the liquid space 30 falls below ambient pressure is air or another gas.

Small Liquid Leaks on the Low-Pressure Side of the Coolant Pump

With reference to FIG. 3, with a small liquid leak on the low-pressure side of the coolant pump 14, for example, in the liquid space 30 or otherwise in the low pressure coolant line 20 between the heat sink 18 and the coolant pump 14, and with the initial pressure in the liquid space 30 proximate the leak at or greater than ambient pressure, liquid coolant will slowly migrate through the leak from the liquid space 30 or the low pressure coolant line 20 to the environment E as the liquid coolant temperature increases and thereby increases the pressure in the gas space 32 (and, therefore, in the liquid space 30 and in the sealed cooling system 10 generally). Also, gas will slowly migrate through the leak from the environment E to the liquid space 30 or the low pressure coolant line 20 as the liquid coolant temperature decreases and thereby decreases the pressure in the gas space 32 (and, therefore, in the liquid space 30 and in the sealed cooling system 10 generally) below the pressure of the environment E.

Under these circumstances, the actual pressure in the gas space 32 may be expected to behave in substantially the same manner as described above in connection with the small leak in the gas space 32 for the same reasons. Similarly, the processor 28 may be configured to determine the presence and extent of a small leak in the liquid space 30 or in the low pressure coolant line 20 in substantially the same manner as the processor 28 determines and outputs a signal indicative of a small leak in the gas space.

The processor C may be able to distinguish between a small gas leak and a small liquid leak. In the event of a small gas leak, pressure changes detected by the system pressure sensor 22 as a function of temperature changes detected by the system temperature sensor 24 may be expected to be consistent among successive heating and cooling cycles because the respective volumes of the gas space 32 and the liquid space 30 would not change substantially among successive heating and cooling cycles. In the event of a small liquid leak, however, pressure changes detected by the system pressure sensor 22 as a function of temperature changes detected by the system temperature sensor 24 may be expected to vary among successive heating and cooling cycles because the volume of the gas space 32 would increase and the volume of the liquid space 30 would decease among successive heating and cooling cycles because lost liquid coolant would be replaced by gas.

Small Leaks on the High-Pressure Side of the Coolant Pump

With reference to FIG. 4, with a small liquid coolant leak on the high-pressure side of the coolant pump 14, for example, between the coolant pump 14 and the heat sink 18, and with the sealed cooling system 10 initially at or greater than ambient pressure, liquid coolant will leak from the high pressure side of the coolant pump 14 to the environment E as the liquid coolant temperature increases and thereby increases the pressure in the gas space 32 and, therefore, in the liquid space 30 and in the sealed cooling system 10 generally. The leak rate may be higher when the coolant pump 14 is running compared to when the coolant pump 14 is not running because of the fluid pressure generated by the operation of the coolant pump 14. Also, gas will slowly migrate through the leak from the environment E to the high pressure side of the coolant pump 14 when the coolant pump 14 is shut down and the liquid coolant temperature decreases, thereby decreasing the pressure in the gas space 32 (and, therefore, in the liquid space 30 and in the sealed cooling system 10 generally).

Under these circumstances, during any given heating and cooling cycle, the actual pressure in the gas space 32 may be expected to behave in generally the same manner as described above in connection with the small leak in the gas space 32 for the same reasons. Also, as suggested above, the leakage rate may also be affected by the output pressure of the coolant pump 14.

As discussed above, during a given heating and cooling cycle, some liquid coolant is lost through the small leak as the pressure in the gas space 32 increases. The lost liquid coolant is replaced with gas as the pressure in the gas space 32 decreases. It follows that the volume of the gas space increases over successive heating and cooling cycles. Accordingly, for a given small liquid leak, the deviation between actual pressure in the gas space 32 and predicted pressure in the gas space 32 as a function of liquid coolant temperature increases with successive heating and cooling cycles.

The processor 28 may be configured to determine and output a signal indicative of the presence and extent of a small leak in the liquid space 30 or in the low pressure coolant line 20 in substantially the same manner as the processor 28 determines and outputs a signal indicative of a small leak in the gas space. The processor 28 may also be configured to distinguish between a small gas leak and a small liquid leak on the high-pressure side of the coolant pump if the processor 28 determines that the leakage rate is higher with the coolant pump 14 running than with the coolant pump 14 not running. The processor 28 may further be configured to distinguish between a small gas leak and a small liquid leak on the high-pressure side of the coolant pump if the deviation between actual pressure in the gas space 32 and predicted pressure in the gas space 32 as a function of liquid coolant temperature increases with successive heating and cooling cycles. The processor 28 may be configured to output a signal indicative of such a leak and the extent of such a leak accordingly.

Large Leaks on the High-Pressure Side of the Coolant Pump

With continued reference to FIG. 4, with a large leak present on the high-pressure side of the coolant pump 14, liquid coolant will rapidly leak from the high pressure side of the coolant pump 14 to the environment E irrespective of the liquid coolant temperature. The leakage rate may greater with the coolant pump 14 running than with the coolant pump 14 not running. The leakage may continue until the coolant tank 12 is empty of liquid coolant or sufficiently empty of liquid coolant so that the coolant pump 14 lacks sufficient net positive suction head for continued operation of the coolant pump 14. This condition will result in a loss of pump output pressure, which may be detected by the optional pump output pressure sensor 25.

The processor 28 may be configured to determine and output a signal indicative of a large leak in the event the pressure in the gas space 32 does not rise with increasing coolant temperature and if the output pressure of the coolant pump 14 is decreasing or lost.

Oil tanks and oil systems may vent the tank oil pressure to ambient at all conditions which may mask the effect of a leak from a pressure measurement other than a delta pressure based on coolant elevation in the tank. Some oil and coolant systems may have oil level sensors. Due to attitude changes of inertia loads, these sensors may be only used to trend the oil level based on sea level readings and not used inflight.

The present disclosure applies to sealed coolant systems in aerospace applications using a liquid coolant or oil where it is desirable to indicate a leak. In some embodiments, the coolant system is sealed after being filled with a pressure measurement in the vapor portion of the tank. The pressure indicated may initially be at the ambient pressure during the filling of the tank and will be modified by air and vapor gas expansion due to temperature in the tank per the gas laws; liquid expansion due to the thermal expansion coefficient; bulk modulus liquid expansion effects caused by pressure changes to the liquid coolant; change in volume of the system due to expansion of the pressure vessels and tubes as a function of temperature; and/or elastic deflection of the system pressure vessels including tubing caused by the increasing oil and air pressure.

The effects of liquid thermal expansion, pressure vessel thermal expansion, and liquid and component elastic pressure deflection may be typically small relative to gas expansion effects assuming a significant air volume in the tank which can be confirmed based on the oil fill to spill procedure or oil level sensor. If the system is well sealed then the pressure may increase or decrease based on the expansion of the oil tank air which can be predicted or trended based on the oil temperature changes relative to the temperature when the tank was filled.

Hence, a leak of oil or air can be detected since it will either reduce the air mass and, hence, reduce air density and hence reduce air pressure per the gas laws; reduce the volume of oil liquid that will increase the tank air volume resulting in a reduction of pressure per the gas laws; and/or a combination of the above.

The effect of inadequate cooling with no leak in a well-sealed system may be superimposed on the effect of the expected changes in tank pressure due to temperature, so the use of a model or trending an inadequate coolant fill procedure is detectable depending on the reduced coolant level and the accuracy of the pressure sensor in the tank. For example, in a well-sealed system, if the air volume in the tank is doubled due to incomplete coolant fill, the increase in air pressure resulting from a given temperature change would be double the expected pressure increase and readily detectable. The effects of liquid and component thermal and mechanical expansion could be used to make a more accurate assessment.

In the event of a minor air leak, the pressure in the tank may drop based on the difference between the oil tank pressure and ambient pressure. For an aerospace application, the ambient pressure may be significantly lower at altitude which will increase the leakage rate so the pressure will drop more rapidly at altitude. When the aircraft lands, if the pressure has dropped below sea level pressure, then air could re-enter the tank from the atmosphere and slowly increase tank air pressure. As the oil tank temperature drops as the oil and engine cools after shutdown this would reduce the tank pressure further allowing more air to enter.

If the aircraft is on the ground for long enough with a small air leak in the tank, then tank pressure may restabilize at ambient pressure. Thus, a small air leak in the tank could result in pressure cycling with altitude and oil temperature that could be predicted or trended to indicate an air leak and distinguish it from an oil leak.

This concept may be applied to the coolant foaming in the tank and with a series of baffles in the tank that may be used to ensure coolant during inertial loads since it uses all gas and vapor inside the tank and not the orientation or a distinct liquid level. Examples include sealed oil tank or cooling circuits for aerospace.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A sealed cooling system for use in an aerospace application, the sealed cooling system comprising:
    a coolant tank configured to hold a liquid coolant and a gas comprising at least one of air and liquid coolant vapor, the coolant tank comprising:
        a liquid coolant space configured to hold the liquid coolant; and
        a gas space configured to hold the gas;
    a heat source configured to transfer heat from the heat source to the liquid coolant;
    a heat exchanger configured to reject heat from the liquid coolant to an environment;
    a pressure sensor configured to detect a pressure in the coolant tank and to output signals indicative of the pressure in the coolant tank as a function of time;
    a temperature sensor configured to detect a temperature within the sealed cooling system and to output signals indicative of the temperature within the sealed cooling system as a function of time; and
    a processor configured to receive the signals indicative of the pressure and the signals indicative of the temperature and to provide an output indicative of a leak in the sealed cooling system based on detected changes in the pressure in the coolant tank as a function of detected changes in the temperature within the sealed cooling system compared to anticipated changes in the pressure in the coolant tank as a function of detected changes in temperature within the sealed cooling system.

2. The sealed cooling system of claim 1, wherein the processor is configured to provide the output indicative of a leak in the sealed cooling system when the detected pressure in the gas space is lower than an anticipated pressure in the coolant tank.

3. The sealed cooling system of claim 1, wherein the processor is configured to provide the output indicative of a leak in the sealed cooling system when the pressure in the coolant tank increases at a rate lower than an anticipated rate as a function of an increase in the temperature within the liquid cooling system.

4. The sealed cooling system of claim 1, wherein the processor is configured to provide the output indicative of a leak in the sealed cooling system when the pressure in the coolant tank decreases at a rate lower than an anticipated rate as a function of a decrease in the temperature within the liquid cooling system.

5. The sealed cooling system of claim 1, wherein the processor is configured to provide the output indicative of a leak in the sealed cooling system when:
    the pressure in the coolant tank increases from an initial pressure to an elevated pressure as a function of an increase in the temperature within the sealed cooling system from an initial temperature to an elevated temperature, and
    the pressure in the coolant tank then decreases to a pressure less than the initial pressure as a function of a decrease in the temperature within the sealed cooling system from the elevated temperature to the initial temperature.

6. The sealed cooling system of claim 1, wherein the processor is configured to provide the output indicative of a leak in the sealed cooling system when:
the pressure in the coolant tank increases from an initial pressure to an elevated pressure as a function of an increase in the temperature within the sealed cooling system from an initial temperature to an elevated temperature,
the pressure in the coolant tank then decreases to a pressure less than the initial pressure as a function of a decrease in the temperature within the sealed cooling system from the elevated temperature to the initial temperature, and
the pressure in the coolant tank then increases to the initial pressure with the temperature within the sealed cooling system at or less than the initial temperature.

7. The sealed cooling system of claim 1, further comprising an ambient pressure sensor configured to detect ambient pressure outside the sealed cooling system and to output signals indicative of the ambient pressure outside the sealed cooling system as a function of time,
wherein the processor further is configured to receive the signals indicative of the ambient pressure outside the sealed cooling system and to provide the output indicative of the leak in the sealed cooling system when the pressure in the coolant tank increases or decreases as a function of corresponding increases or decreases in the temperature within the sealed cooling system and as a function of corresponding decreases or increases in the ambient pressure at a rate less than or greater than an anticipated rate.

8. The sealed cooling system of claim 1, further comprising an ambient pressure sensor configured to detect ambient pressure outside the sealed cooling system and to output signals indicative of the ambient pressure outside the sealed cooling system as a function of time,
wherein the processor further is configured to receive the signals indicative of the ambient pressure outside the sealed cooling system and to provide the output indicative of the leak in the sealed cooling system when the pressure in the coolant tank increases or decreases as a function of corresponding decreases or increases in the ambient pressure at a rate less than or greater than an anticipated rate.

9. The sealed cooling system of claim 1, further comprising a coolant pump configured to pump the liquid coolant and a coolant pump output pressure sensor configured to detect an output pressure of the coolant pump and to output signals indicative of the output pressure of the coolant pump,
wherein the processor further is configured to receive the signals indicative of the output pressure of the coolant pump and to provide the signal indicative of the leak in the sealed cooling system when the signals indicative of the output pressure of the coolant pump indicate that the output pressure of the coolant pump is decreasing consistent with pressure in the coolant tank or is less than a predetermined value when the coolant pump is running.

10. A method of detecting leakage in a sealed cooling system for use in an aerospace application, the method comprising the steps of:
providing a coolant tank configured to hold a liquid coolant and a gas comprising at least one of air and liquid coolant vapor, the coolant tank comprising:
a liquid coolant space configured to hold the liquid coolant; and
a gas space configured to hold the gas;
providing a heat source configured to transfer heat from the heat source to the liquid coolant;
providing a heat exchanger configured to reject heat from the liquid coolant to an environment;
providing a pressure sensor configured to detect a pressure in the coolant tank and to output signals indicative of the pressure in the coolant tank as a function of time;
providing a temperature sensor configured to detect a temperature within the sealed cooling system and to output signals indicative of the temperature within the sealed cooling system as a function of time;
providing a processor configured to receive the signals indicative of the pressure and the signals indicative of the temperature; and
determining the presence of a leak in the sealed cooling system based on detected changes in the pressure in the coolant tank as a function of detected changes in the temperature within the sealed cooling system compared to anticipated changes in the pressure in the coolant tank as a function of detected changes in temperature within the sealed cooling system.

11. The method of claim 10, further comprising the step of determining the presence of a leak in the sealed cooling system when the detected pressure in the coolant tank is lower than an anticipated pressure in the coolant tank.

12. The method of claim 10, further comprising the step of determining the presence of a leak in the sealed cooling system when the pressure in the coolant tank increases at a rate lower than an anticipated rate as a function of an increase in the temperature within the sealed cooling system.

13. The method of claim 10, further comprising the step of determining the presence of a leak in the sealed cooling system when the pressure in the coolant tank decreases at a rate lower than an anticipated rate as a function of a decrease in the temperature within the sealed cooling system.

14. The method of claim 10, further comprising the step of determining the presence of a leak in the sealed cooling system when:
the pressure in the coolant tank increases from an initial pressure to an elevated pressure as a function of an increase in the temperature within the sealed cooling system from an initial temperature to an elevated temperature, and
the pressure in the coolant tank then decreases to a pressure less than the initial pressure as a function of a decrease in the temperature within the sealed cooling system from the elevated temperature to the initial temperature.

15. The method of claim 10, further comprising the step of determining the presence of a leak in the sealed cooling system when:
the pressure in the coolant tank increases from an initial pressure to an elevated pressure as a function of an increase in the temperature within the sealed cooling system from an initial temperature to an elevated temperature,
the pressure in the coolant tank then decreases to a pressure less than the initial pressure as a function of a decrease in the temperature within the sealed cooling system from the elevated temperature to the initial temperature, and
the pressure in the coolant tank then increases to the initial pressure with the temperature within the sealed cooling system at or less than the initial temperature.

16. The method of claim 10, further comprising the steps of:
providing an ambient pressure sensor configured to detect ambient pressure outside the sealed cooling system and to output signals indicative of the ambient pressure outside the sealed cooling system as a function of time, and
determining the presence of a leak in the sealed cooling system when the pressure in the coolant tank increases or decreases as a function of corresponding increases or decreases in the temperature within the sealed cooling system and as a function of corresponding decreases or increases in the ambient pressure at a rate greater than an anticipated rate.

17. The method of claim 10, further comprising the steps of:
providing a coolant pump configured to pump the liquid coolant and a coolant pump output pressure sensor configured to detect coolant pump output pressure and to output signals indicative of the coolant pump output pressure as a function of time, and
determining the presence of a leak in the sealed cooling system when the coolant pump output pressure is decreasing consistent with decreasing pressure in the coolant tank or is less than a predetermined value when the coolant pump is running.

18. A method of detecting leakage in a sealed cooling system for use in an aerospace application, the sealed cooling system including a coolant tank having a liquid space configured to hold a liquid coolant, and having a gas space configured to hold gas, the method comprising the steps of:
detecting a first temperature within the sealed cooling system;
detecting a first pressure in the coolant tank corresponding to the first temperature;
detecting a second temperature within the sealed cooling system greater than the first temperature;
predicting a second pressure in the gas space corresponding to the second temperature;
detecting a second pressure in the coolant tank corresponding to the second temperature;
comparing the detected second pressure to the predicted second pressure; and
determining the presence of a leak in the sealed cooling system if the detected second pressure deviates from the predicted second pressure according to predetermined criteria.

19. The method of claim 18, further comprising the steps of:
detecting a third temperature within the sealed cooling system greater than the second temperature;
predicting a third pressure in the gas space corresponding to the second temperature;
detecting a third pressure in the gas space corresponding to the second temperature;
comparing the detected third pressure to the predicted third pressure; and
determining the presence of a leak in the sealed cooling system if a rate of change of pressure in the gas space based on the first, second, and third pressures deviates from a predicted rate of change of pressure in the coolant tank according to predetermined criteria.

20. The method of claim 19, further comprising the steps of:
detecting first, second, and third ambient pressures of an environment outside the sealed cooling system corresponding to the first, second, and third temperatures;
comparing the first, second, and third ambient pressures to the first, second third pressure; and
determining the presence of a leak in the sealed cooling system if the first, second, and third detected pressures in the coolant tank track the first, second, and third ambient pressures according to predetermined criteria.

\* \* \* \* \*